United States Patent [19]

Brun et al.

[11] Patent Number: 4,917,773

[45] Date of Patent: Apr. 17, 1990

[54] PROCESS FOR INTRODUCING ZIRCONIUM TETRACHLORIDE, HAFNIUM TETRACHLORIDE AND MIXTURES THEREOF INTO A COLUMN FOR THE CONTINUOUS EXTRACTIVE DISTILLATION UNDER PRESSURE OF SAID CHLORIDES

[75] Inventors: Pierre Brun, Grenoble; Jean Guerin, Frejus, both of France

[73] Assignee: Compagnie Europeenne Du Zirconium Cezus, Courbevoie, France

[21] Appl. No.: 319,054

[22] Filed: Mar. 6, 1989

[30] Foreign Application Priority Data

Mar. 31, 1988 [FR] France ............... 88 04731

[51] Int. Cl.$^4$ .................. B01D 3/40; C01G 25/04; C01G 27/04
[52] U.S. Cl. .......................... 203/50; 203/77; 203/91; 203/DIG. 16; 23/294 R; 202/153; 202/176; 266/146; 423/76; 423/78; 423/84
[58] Field of Search ........... 203/50, 91, 1, 98, 77, 203/94, DIG. 16; 423/73, 76, 84, 77, 78, 492; 23/294 R; 202/153, 176; 422/187, 189; 266/146

[56] References Cited

U.S. PATENT DOCUMENTS 2,816,814 12/1957 Plucknett .................. 23/294
2,852,446 9/1958 Bromberg .................. 423/492
3,098,722 7/1963 Carlson et al. ............. 23/294
3,671,186 6/1972 Ishizuka .................... 423/73
3,966,458 6/1976 Spink ....................... 423/73
4,021,531 5/1977 Besson et al. ............. 423/492
4,737,244 4/1988 McLaughlin et al. ......... 423/73
4,749,448 6/1988 Stoltz et al. ............... 423/73

FOREIGN PATENT DOCUMENTS 45270 2/1982 European Pat. Off. ........ 423/73
2543162 9/1984 France ..................... 203/50

Primary Examiner—Wilbur Bascomb
Attorney, Agent, or Firm—Dennison, Meserole, Pollack & Scheiner

[57] ABSTRACT

The process and the device according to the invention relate to the introduction, at a stable, known flow rate, of sublimable tetrachloride into a column for continuous extractive distillation under pressure of the chlorides. The sublimable tetrachloride is dissolved in a hot dissolver in a liquid solvent such as $KAlCl_4$, and is then recirculated by pump at a stable, known flow rate into an evaporator connected to the column. The solution is then heated in an evaporator in order to sublime the majority of the product which it contains, the sublimed vapors thus passing into the column at a stable, known flow rate. The process according to the invention is adapted, in particular, to a plant for the production of $ArCl_4$ of nulear purity and of $HfCl_4$.

13 Claims, 1 Drawing Sheet

PROCESS FOR INTRODUCING ZIRCONIUM TETRACHLORIDE, HAFNIUM TETRACHLORIDE AND MIXTURES THEREOF INTO A COLUMN FOR THE CONTINUOUS EXTRACTIVE DISTILLATION UNDER PRESSURE OF SAID CHLORIDES

BACKGROUND OF THE INVENTION

The process and the device of the invention relate to the continuous introduction, at a stable and continuous flow rate, of zirconium tetrachloride, hafnium tetrachloride and mixtures thereof into a column for continuous extractive distillation under pressure of such chlorides.

The principle of feeding a column for the extractive distillation of zirconium and hafnium tetrachlorides in "hafnium-containing crude zirconium tetrachloride" vapour resulting from sublimation is known from the patent FR-C2250707. However, experience has shown that it is particularly difficult to introduce such vapour continuously under a "pressure" of between 0.0005 and 0.15 MPa and at a stable, sufficiently well known flow rate.

It should be noted that, in this text, and as conventional for internal pressures, the term "pressure" denotes the excess pressure relative to atmospheric pressure.

In fact, it is known that such chlorides can be introduced into a container by means of a screw which is possibly vibrated. If this container is under pressure, the screw lifts gas or sublimed vapour originating from the powder introduced. If the gaseous phase does not condense in the screw, its ascent through the screw obstructs or prevents the flow of powder, depending on the value of the pressure in this gaseous phase. If the gaseous phase condenses, a paste which tends to obstruct the screw is formed in the screw. In the case of zirconium tetrachloride, $ZrCl_4$, which sublimes at about 335° C. at atmospheric pressure, its conveyance by a screw, which may or may not be vibrated, into a sublimation apparatus at 335° C. causes ascent of sublimated $ZrCl_4$ vapour, which condenses in the screw and blocks it.

To overcome such disadvantages, various modifications of this introduction process have been tested by attempting either to balance the pressures on the two sides of the introduction screw, for example by closing the hopper for supplying the screw with powder and by injecting a small flow of neutral gas on this side of the screw, or to counteract the ascent of compressed gaseous phase in the screw, for example by injecting a neutral gas such as nitrogen into the container under pressure at the end of the screw so as to produce a cushion of inert gas. This second modification, which is appropriate for a continuous supply, does not completely prevent ascent of gaseous phase and condensation in the case of $ZrCl_4$. It is thus necessary to prevent it more completely by additional variations, for example by adding a means for heating the nozzle at the screw outlet or, on the other hand, by cooling this nozzle and scraping the crust of condensed $ZrCl_4$ as it begins to form, but these measures pose awkward mechanical problems.

However, these modifications do not provide a valid solution if the container is a column for continuous extractive distillation under pressure. In fact, the injection of inert gas interrupts operation of the column the flow of chloride vapours cannot be controlled with precision greater than a relative 1% air can be introduced into the container with the chloride grains, and the oxygen contained is therefore a source of corrosion of the column material.

However, the variations and the imprecision in the control of the flow of vaporised chlorides introduced into the column, in particular, constitute the major drawback of the methods of the prior art.

This is why the applicants have sought a means of introducing, in particular, hafnium-containing zirconium tetrachloride into a column for extractive distillation of hafnium tetrachloride which is more accurate and more reliable, in which neutral gas is not added, even in a small quantity, and which is capable of operating under a pressure difference between a low value, for example 0.0005 MPa, and at least 0.15 MPa, this pressure difference being the difference existing between the sublimation apparatus and the column on the one hand and the atmosphere on the other hand.

Since the zirconium chlorides, hafnium chloride and mixtures thereof are soluble in certain molten salts, as described in French patent FR-C-2250707, the applicants have had the idea of using such solvents in the process according to the invention and, in particular, the complex potassium chloroaluminate solvent, $KAlCl_4$ or $(KCl,AlCl_3)$.

In fact, tests have shown that this complex solvent is barely volatile. Its KCl vapour pressure is almost zero, its $AlCl_3$ vapour pressure is low and these zero or low vapour pressure are not troublesome in the process of extractive distillation in the patent FR-C-2250707. At 335° C., the sublimation temperature of $ZrCl_4$ at atmospheric pressure, this solvent dissolves a quantity of $ZrCl_4$ greater than 40 g per 100 g of solvent, and when the solution obtained is reheated to about 500° C., more than 90% of $ZrCl_4$ dissolved therein escapes in the form of vapour. Such a solution containing 40 g of $ZrCl_4$ in 100 g of potassium chloroaluminate is homogeneous and is therefore pumpable between about 300° and 350° C. Its flow rate is thus continuously measurable and controllable.

However, according to the patent FR-C-2250707, other complex solvents can be used as, like $KAlCl_4$, they have significant differences in solubility of zirconium and hafnium tetrachlorides with temperature and pressure and allow the dissolved $ZrCl_4$ and $HfCl_4$ to be recovered. These are: $NaAlCl_4$, $KFeCl_4$ and $NaFeCl_4$. However, those which contain potassium have unexpectedly been found to be more favourable than those containing sodium with regard to the total solubility of the Zr and Hf chlorides, their relative volatility and their stability because they lead to good reliability of operating of the distillation installation and to constancy in the quality of the hafnium-containing zirconium chloride content.

SUMMARY OF THE INVENTION

The invention therefore relates to a process for introducing zirconium tetrachloride, hafnium tetrachloride and mixtures thereof into a column for continuous extractive distillation under pressure using the dissolution of these chlorides in a liquid solvent, in which the vapour pressure and the solubility of these chlorides vary significantly with the temperature and the pressure, this process comprising at least the following stages (a1) dissolution of the chlorides in the liquid solvent at atmospheric pressure and at a temperature $\theta_1$ to produce a solution of given, that is to say calculable and controllable, concentration;

(b1) transfer of this solution, optionally with intermediate storage in a storage tank;

(c1) compression and control of the flow rate of this solution to constant values by known means, for example by using a metering pump or by using a centrifugal pump completed by a flow meter and a flow regulator;

(d1) introduction of this compressed solution having a constant flow rate into an evaporator connected to the column, the evaporator being at the pressure of the column;

(e1) reheating of the solution in this apparatus to a selected temperature $\theta_2$ higher than $\theta_1$ and sufficient to sublime the majority of said chlorides contained in the solution, the sublimated vapours thus passing at a known, stable flow rate into the column.

In this last stage, the solution from which the majority of sublimable chlorides have been removed is preferably recycled into the following dissolution operation or operations (stage a1), optionally by means of a buffer tank.

The solvent used is one of the four complex solvents presented in the patent FR-C-2250707 and mentioned in this description. It has been seen that, according to that patent, the most favourable solvents are $KAlCl_4$ and $KFeCl_4$, and it has been found, in practice, that it was preferable to use chloroaluminate $KAlCl_4$ which is more stable than chloroferrate. The sublimation yield after reheating the solution to between 430° and 550° C.; preferably between 450° and 500° C., is thus higher than 70% and is typically between 80 and 95% for a pressure in the evaporator, in which this preheating is effected, of between 0.0005 and 0.15 MPa. Owing to a stable concentration and flow rate of solution and a stable reheating temperature, a flow rate of hafniumcontaining $ZrCl_4$ vapour which is stable and is controlled within a variation of less than 1%, in the column under pressure, is easily obtained.

The following example and diagram, given as non-limiting examples, will assist understanding of implementation of the process according to the invention.

The example given relates to the introduction of hafnium-containing $ZrCl_4$ into a column for continuous extractive distillation of zirconium and hafnium tetrachlorides according to the process in the patent FR-C-2250707.

DETAILED DESCRIPTION OF THE INVENTION

Figure 1:
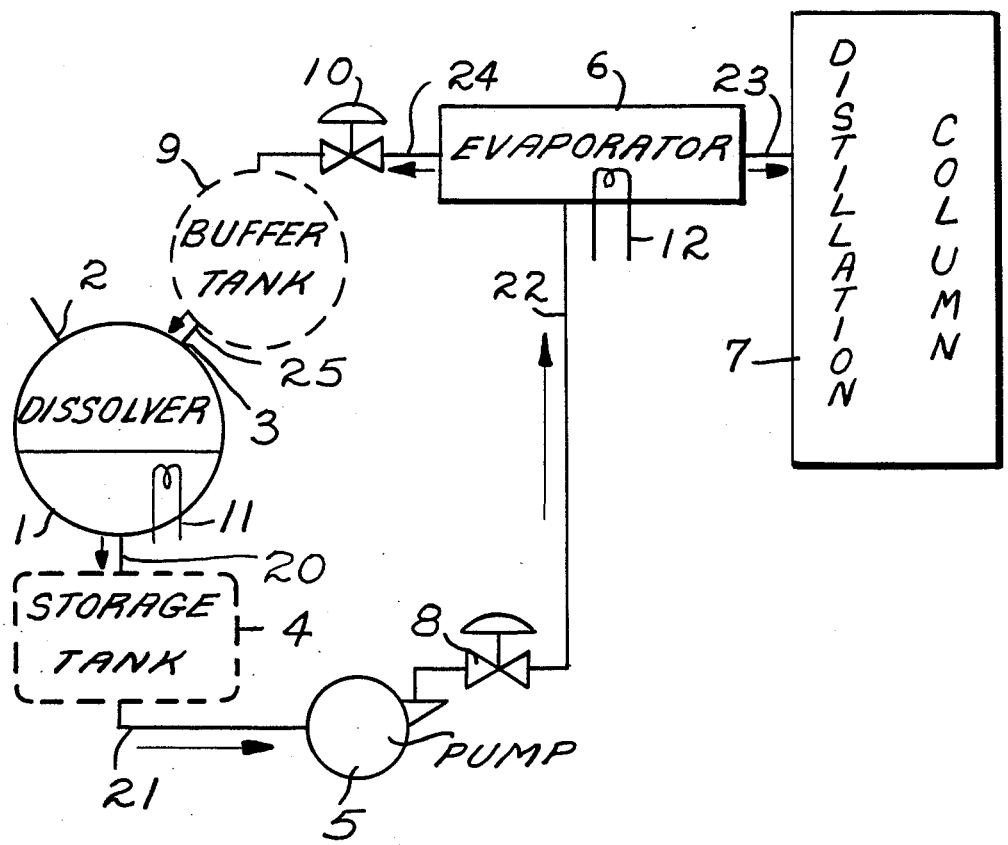
FIG. 1 shows schematically the device for introducing the hafnium-containing $ZrCl_4$ into such a column.

The dissolver 1 shown is a receiver equipped with a heating means 11. 400 kg of solid, powdered hafnium-containing $ZrCl_4$, then 1000 kg of liquid $KAlCl_4$ are introduced into dissolver 1, for example through one or two orifices 2 in the lid of the dissolver at a temperature of between 250° and 350° C. to effect a first dissolution operation. During the following dissolution operations, the solution which is depleted in hafniumcontaining $ZrCl_4$, that is to say solvent containing, for example, 2 to 10 g of hafnium-containing $ZrCl_4$ per 100 g of solvent, can be recycled through a further orifice 3, knowledge of its concentration of hafnium-containing $ZrCl_4$ allowing the quantities of powdered tetrachloride and solvent to be adjusted in order to obtain a solution with an almost constant content. After closure of the orifices 2 and 3, the receiver 1 is heated to promote dissolution of the hafniumcontaining $ZrCl_4$, and a solution containing 40 g of hafniumcontaining $ZrCl_4$ per 100 g of solvent is obtained at a temperature $\theta_1$ of between 280° and 350° C. This solution, the content of which is known within a variation of less than 1%, may optionally be filtered to remove the solid impurities which might impair operation of the pump 5 and of the flow meter (see below). The solution is preferably transferred to a storage tank 4 via a line 20 where it is optionally reheated to a predetermined temperature, from which the remainder 5, 6 of the device and the column 7 are supplied continuously.

The solution is then transferred to a pump 5 via a line 21 which allows it to be recirculated into an evaporator 6 via a line 22 which is connected by a nozzle to the extractive distillation column 7 and is at the same pressure as the column. The accurate recirculation of a liquid into an apparatus under a pressure which can be as much as 0.15 MPa is achieved using a metering pump or a centrifugal pump of a type which can be used at between 280° and 350° C. with heat-carrying fluids or molten salts. The flow rate of the solution should be measured and controlled with precision better than a relative variation of 1% to ensure that the column 7 is supplied correctly and operates perfectly. To this end, a flow meter and a flow regulator 8 are added at the outlet of the pump in the case of a centrifugal pump.

The evaporator 6 provides, via heater 12, the calories required for reheating the solution which is recirculated at a temperature such that the evaporation of hafnium-containing $ZrCl_4$ is almost complete: between 430° and 550° C., at least 70% of the dissolved hafnium-containing $ZrCl_4$ has evaporated and, more typically, between 450° and 500° C., 80 to 95% of the $ZrCl_4$ has evaporated with a pressure in the evaporator and in the column of between 0.0005 and 0.15 MPa. If the temperature is stable, as well as the pressure, the flow of hafnium-containing $ZrCl_4$ vapour to the column 7 via a line 23 is stable and is controlled within a variation of less than 1%.

The depleted solution containing, for example, about 4 g of hafnium-containing $ZrCl_4$ per 100 g of solvent, if the evaporation or sublimation yield of dissolved hafnium-containing $ZrCl_4$ is 90%, flows from the evaporator either by overflowing or by adjustment of level and is preferably recycled for the sake of economy. This depleted solution is then directed, after possible cooling to about 330° C., through a line 24 into a buffer tank 9 from which it is taken through a line 25 for the following dissolution operation or operations, the depleted solution thus being introduced in a known quantity into the dissolver 1 through a nozzle leading to the orifice 3. If the depleted solution is discharged by overflowing, a graduated valve 10 or a syphon-type hydraulic barrier is required to prevent a drop of pressure in the evaporator 6 and in the downstream column 7.

Generally speaking, the process of the invention can be applied to the supply of reduced pressure columns as well as to the supply of excess pressure columns.

It has been mentioned that the liquid solvent in which the vapour pressure and the solubility of hafnium-containing $ZrCl_4$ vary significantly with the temperature and the pressure is preferably potassium chloroaluminate $KAlCl_4$ or $(KCl,AlCl_3)$. The concentration range employable in practice is thus: 25 to 55 g of crude ZrCl$_4$ per 100 g of this solvent, and the preferred concentration is from 35 to 45 g of ZrCl$_4$ per 100 g of this solvent. The process allows vapours of pure crude product (ZrCl$_4$, HfCl$_4$) to be introduced into the column 7 for the extractive distillation of ZrCl$_4$ and HfCl$_4$ without mixing inert gas, at a stable, known flow rate.

The process according to the invention also applies to HfCl$_4$, with the same solvent and the same concentration ranges.

The invention also relates to a device for introducing zirconium tetrachloride, hafnium tetrachloride and mixtures thereof into a column for continuous extractive distillation under pressure, this device comprising at least:

(a2) a hot dissolver 1 provided with supply means: for chlorides 2, for liquid solvent 2, optionally for recycled solvent 3;

(b2) means 5 for recirculation under pressure of the hot solution obtained and means 5, 8 for control of its flow rate;

(c2) an evaporator/reheating apparatus 6 equipped with a supply of solution which is recirculated by the pump 5, the evaporator 6 being connected to the column 7 by a nozzle and being equipped with an outlet for depleted solution;

(d2) a means 10 connected to the outlet for depleted solution for preventing the pressure drop in the evaporated/reheating apparatus 6 and the column 7 located downstream, for example a graduated valve or a hydraulic barrier.

The process according to the invention is adopted, in particular, in plant for the manufacture of ZrCl$_4$ of nuclear purity and of HfCl$_4$.

What is claimed is:

1. Process for introducing zirconium tetrachloride, hafnium tetrachloride or mixtures thereof into a column for continuous extractive distillation under pressure, comprising the steps of:

(a) dissolving said zirconium tetrachloride, hafnium tetrachloride or mixtures thereof in a liquid solvent in which the vapor pressure and solubility of said tetrachlorides vary significantly with temperature and pressure, at atmospheric pressure and at a predetermined temperature $\theta_1$ to yield a solution of predetermined concentration;

(b) transferring said solution, with compression and at constant and predetermined flow rate, to an evaporator connected to a column for extractive distillation, said evaporator and column being at the same pressure;

(c) reheating the solution in the evaporator to a predetermined temperature $\theta_2$ higher than $\theta_1$, and sufficient to cause sublimation of the majority of the tetrachlorides in the solution; and (b) introducing the sublimed tetrachlorides into the column for continuous extractive distillation at a predetermined flow rate.

2. Process according to claim 1, wherein the solution from which the tetrachlorides have been sublimed is subsequently recycled into a further dissolving step (a).

3. Process according to claim 1, wherein the pressure common to the evaporator (6) and the column (7) is 0.0005 to 0.15 MPa greater than atmospheric pressure.

4. Process according to claim 1, wherein said transferring step comprises transferring said solution to an intermediate storage tank, and continuously transferring said solution to said evaporator from said storage tank.

5. Process according to claim 2, wherein said solution from which said tetrachlorides have been sublimed is recycled by transferring said solution from said evaporator to a buffer tank (9), and transferring said solution from said buffer tank to said dissolver (1).

6. Process according to claim 1, wherein the solvent is potassium chloroaluminate (KAlCl$_4$).

7. Process according to claim 6, wherein the temperature $\theta_1$ is between 280° and 350° C., and the reheating temperature $\theta_2$ is between 430° and 550° C.

8. Process according to claim 7, wherein the predetermined concentration of said solution is from 25 to 55 g of dissolved hafnium-containing zirconium tetrachloride per 100 g of solvent.

9. Process according to claim 2 wherein the solvent is potassium chloroaluminate (KAlCl$_4$).

10. Process according to claim 3, wherein the solvent is potassium chloroaluminate (KAlCl$_4$).

11. Process according to claim 4, wherein the solvent is potassium chloroaluminate (KAlCl$_4$).

12. Process according to claim 9, 10 or 11, wherein the temperature $\theta_1$ is between 280° and 350° C., and the reheating temperature $\theta_2$ is between 430° and 550° C.

13. Process according to claim 12, wherein the predetermined concentration of said solution is from 25 to 55 g of dissolved hafnium-containing zirconium tetrachloride per 100 g of solvent.

* * * * *